(12) United States Patent
Johnson

(10) Patent No.: US 10,607,581 B1
(45) Date of Patent: Mar. 31, 2020

(54) PERSONALIZED GUITAR PICK

(71) Applicant: Jason Johnson, Greensboro, NC (US)

(72) Inventor: Jason Johnson, Greensboro, NC (US)

( * ) Notice: Subject to any disclaimer, the term of this patent is extended or adjusted under 35 U.S.C. 154(b) by 0 days.

(21) Appl. No.: 16/298,118

(22) Filed: Mar. 11, 2019

(51) Int. Cl.
*G10D 3/16* (2020.01)
*B29C 35/02* (2006.01)

(52) U.S. Cl.
CPC ............. *G10D 3/163* (2013.01); *B29C 35/02* (2013.01)

(58) Field of Classification Search
CPC ................................ G10D 3/163; B29C 35/02
See application file for complete search history.

(56) References Cited

U.S. PATENT DOCUMENTS

| | | | | |
|---|---|---|---|---|
| 3,319,505 | A * | 5/1967 | Galetzky | G10D 3/163 84/322 |
| 2004/0118265 | A1* | 6/2004 | Katz | G10D 3/163 84/322 |
| 2007/0087795 | A1* | 4/2007 | Aletto | G06K 9/00885 462/1 |

* cited by examiner

*Primary Examiner* — Kimberly R Lockett
(74) *Attorney, Agent, or Firm* — Tuggle Duggins P.A.; Blake P. Hurt

(57) ABSTRACT

A personalized guitar pick formed from the impressions of a player's fingers manually imprinted on first and/or second sides of the pick is disclosed. Specifically, the first side of the pick is deformed in a thumb-shaped depression while a second side of the pick is molded into a shape corresponding to the index and/or middle fingers after heating the pick to a predetermined melting temperature that corresponds with the thermoplastic material that forms the pick. A method of forming a personalized guitar pick is also disclosed.

20 Claims, 3 Drawing Sheets

PERSONALIZED GUITAR PICK

FIELD OF THE INVENTION

The invention herein pertains to musical accessories, and particularly pertains to a personalized guitar pick formed from a thermally reactive polymeric material that is capable of being molded to one or more digits of a player.

DESCRIPTION OF THE PRIOR ART AND OBJECTIVES OF THE INVENTION

The plectrum is a small flat tool used to pluck or strum a stringed instrument. When used in connection with a guitar, the implement is often referred to as a pick or a speck. The pick has been used in one form or another for most of recorded history, and although the materials have varied over the years, the basic structure of the device has remained largely unchanged. As the popularity and number of players of stringed instruments has increased, the desire for reasonably priced musical accessories such as picks has increased as well. While the pleasure of playing instruments such as the guitar cannot be overstated, extended play can result in numerous challenges to the player and any associated equipment. One of the primary reasons that picks are used by instrument players is that without the pick, electric guitars and acoustic guitars in particular (which typically have metal strings) are highly abrasive on a player's fingers, resulting in sores and abrasions that may prevent further play. While the pick saves the player's fingers, the natural result of using a pick for an extended period of time is the accumulation of oil and/or moisture in the nature of sweat that makes it difficult to accurately grip the pick. Given the accuracy required for high-level picking and resulting fatigue, players have been in search for a solution for centuries.

Thus, in view of the problems and disadvantages associated with prior art picks, the present invention was conceived and one of its objectives is to provide a pick that is formed from a polymeric material that is deformable.

It is another objective of the present invention to provide a polymeric pick that is efficient to manufacture and easy to conform to the digit or digits of a given player.

It is still another objective of the present invention to provide a pick that includes a depression on a first surface and a groove on an opposing side, It is yet another objective of the present invention to provide a pick formed from a thermally reactive polymeric material.

It is a further objective of the present invention to provide a pick with a thermally reactive thermoplastic or thermosetting polymer that can be molded to the digit or digits of a player.

It is still a further objective of the present invention to provide a pick with one or more lateral wings configured to extend vertically and arcuately from the surface of the pick.

It is yet a further objective of the present invention to provide a method of forming an individualized pick including the steps of providing a thermoplastic base pick, heating the base pick, and impressing upon one or both sides of the pick with the player's fingers to generate a final pick with individualized depressions or grooves on one or both surfaces of the pick.

Various other objectives and advantages of the present invention will become apparent to those skilled in the art as a more detailed description is set forth below.

SUMMARY OF THE INVENTION

The aforesaid and other objectives are realized by providing a generally triangular shaped guitar pick formed from a rigid thermoplastic such as acrylic. The guitar pick defines opposingly oriented sides that are configured to be deformed after heating when contacted by the digit or digits of a player. Specifically, a first side of the pick is deformed in a thumb-shaped depression while a second side of the pick is molded into a shape corresponding to the pointer and/or middle fingers, resulting in a groove pattern in a generally "M" shape. In one embodiment, the pick further includes a pair of wings extending vertically and arcuately from opposing lateral side to embrace a portion of the outer radius of a player's digit or digits. A method of forming an individualized pick including the steps of providing a guitar pick formed from a thermoplastic material, heating the pick to a predetermined melting temperature to render at least the surface of the pick deformable, and impressing upon one or both sides of the pick with the player's fingers to generate a pick with individualized depressions or grooves on one or both surfaces of the pick.

DETAILED DESCRIPTION OF THE PREFERRED EMBODIMENT AND OPERATION OF THE INVENTION

Figure 3:
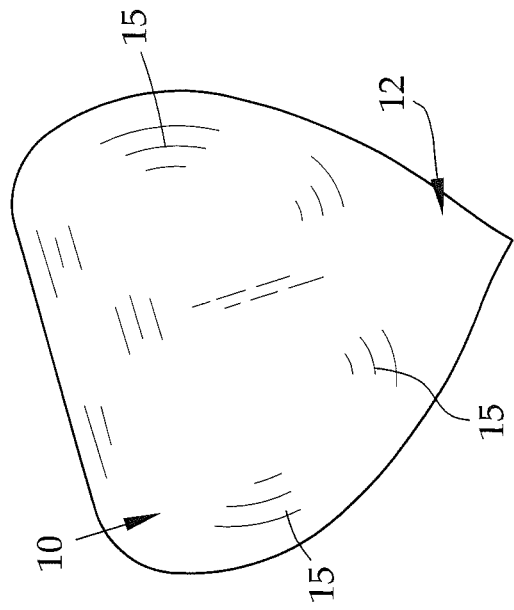
FIG. 3 depicts a perspective view of an alternate embodiment of a personalized guitar pick.
Figure 2:
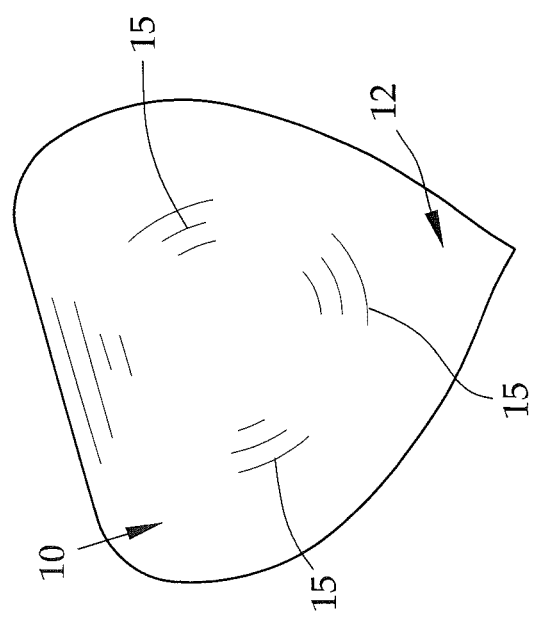
FIG. 2 pictures a perspective view of a personalized guitar pick.

For a better understanding of the invention and its operation, turning now to the drawings, FIGS. 2 and 3 illustrate embodiments of personalized guitar picks 10, 10'. For the purposes of this discussion, the term "pick" is to be construed as small flat tool used to pluck or strum a stringed instrument, much like the definition of plectrum described above. In the preferred embodiment, the pick defines a generally triangular shape although it should be understood that the geometry of picks 10, 10' is not considered a limitation of the instant embodiment. Picks 10 and 10' are preferably formed from a polymeric material, and in the most preferred embodiments the picks are formed from a thermoplastic or thermoset resin. Despite the similar sounding names, thermoplastics are markedly different from thermoset materials. They are both used in the injection molding process, but thermosets can only be heated and molded once. They cannot be changed or melted back into their original shape. This makes them great for high-heat applications, but also makes thermoset plastics less versatile than thermoplastic materials. During the thermoset plastic curing process, polymers are linked together and form a permanent chemical bond. In contrast, no chemical bonding takes place during the curing process of thermoplastics, making it completely reversible. Thermoplastics can be re-melted and remolded whenever it's necessary. For the ease of remolding, thermoplastics are preferred in the instant invention. A non-limiting, exemplary list of thermoplastics includes: acrylic polymer, acrylonitrile butadiene styrene, polybenzimidazole, high-density polyethylene, low-density polyethylene, polypropylene, polycarbonate, polyester, polyurethane, polyamides, nylon, polylactic acid, polysulfone, polyformaldehyde, polyaryletherketone, polyether ether ketone, polyetherimide, polyphenylene oxide, polyphenylene sulfide, polyvinyl chloride, polyvinylidene fluoride, polytetrafluoroethylene, and styrene acrylonitrile, whether homopolymers or copolymers.

Figure 1:
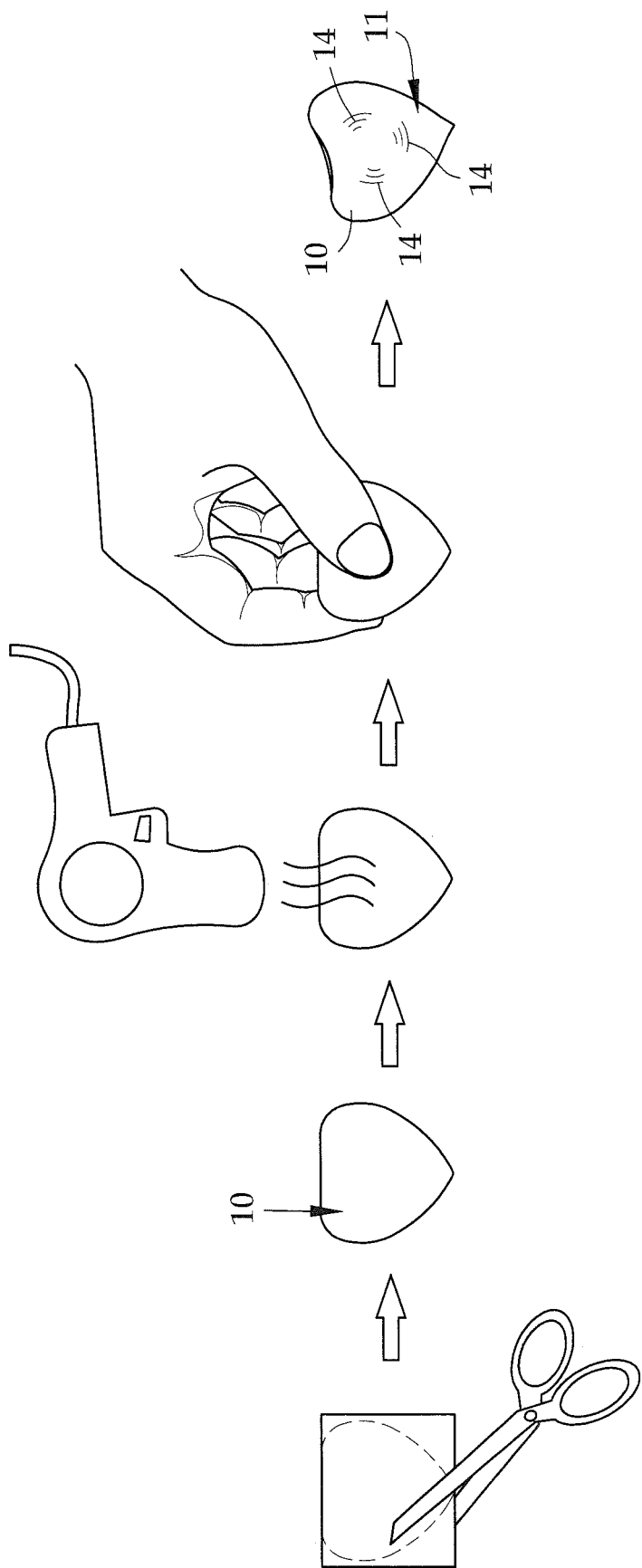
FIG. 1 shows a schematic diagram of forming a personalized guitar pick.

Preferred pick 10 defines a body with first side 11 and second side 12. As described above, embodiments of pick 10 are preferably formed from a thermoplastic material which easily deforms upon heating to a predetermined, specified temperature. For example, as represented in FIG. 1, the surface of first and second sides 11 and 12 may be heated by a direct heating source such as a thermal gun, or by submerging in heated water (it should be understood that the specific heat will be dictated by the material of pick 10). Regardless of the manner in which pick 10 is heated, the surface of first side 11 and second side 12 softens and becomes impressionable. Specifically, these surfaces partially melt to receive physical impressions, for example grooves, ridges, arches, or other structural impressions imparted by a user's finger or fingers. In a non-limiting example, a player may grasp pick 10 after being heated between the index finger and thumb and compress slightly, imparting an impression 14 of the thumb in first side 11 (see pick 10 in FIG. 1) and an impression 15 of the index finger in second side 12 (see FIG. 2). Each impression on first side 11 and/or second side 12 may include ridges, grooves, or other structures that are mimicked in the surface of first side 11 and second side 12.

In another non-limiting example, a player may grasp pick 10 after being heated between the index finger, the middle finger, and thumb and compress slightly, imparting an impression 14 of the thumb in first side 11 (FIG. 1) and an impression 16 of the index finger and middle finger in second side 12 (see FIG. 3). Each impression on first side 11 and/or second side 12 may include ridges, grooves, or other structures that are mimicked in the surface of first side 11 and second side 12. In this embodiment, the groove pattern in the second side 12 defines a generally "M" shape.

Figure 4:
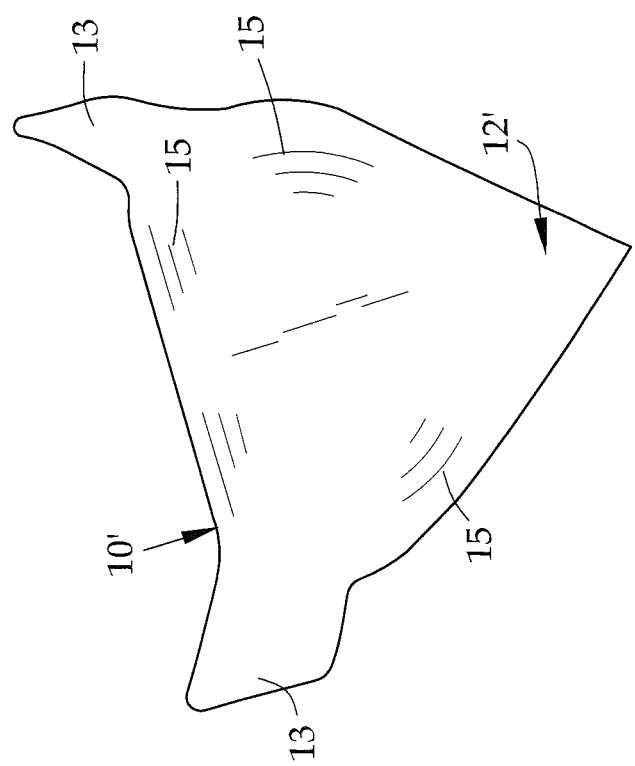
FIG. 4 illustrates a perspective view of an alternate embodiment of a personalized guitar pick.

In an alternate embodiment as represented in FIG. 4, pick 10' defines first side similar to first side 11 and second side 12'. Similar to pick 10, a player may grasp pick 10' after being heated between the index finger and/or the middle finger, and thumb and compress slightly, imparting an impression 14 of the thumb in first side 11' and an impression 14 or 15 of the index finger and/or middle finger in second side 12' (FIG. 4). Additionally, preferred pick 10' defines one or more wings 13 extending vertically and arcuately (i.e. inclusive of a lateral dimension as well) from opposing lateral sides of pick 10' to embrace a portion of the outer radius of a player's digit or digits. Specifically, the geometry of wings 13 defines a concavity relative to a vertical plane extending from the associated lateral edge(s) of pick 10' to accommodate the outer radius of the finger or fingers as described above in order to prevent slippage of the digit or digits during playing sessions.

A method of creating a personalized guitar pick includes the steps of forming a guitar pick 10 or 10' out of a polymeric material such as a thermoplastic material, heating the pick to a predetermined melting temperature to render at least the surface of a first side 11 and second side 12 of the pick deformable, and impressing upon one or both sides of the pick with the player's fingers to generate a pick with individualized impressions, depressions or grooves on one or both surfaces of the pick. Heated water is the preferred heat source, but other heat sources such as a heat gun may be used as desired. In one preferred embodiment, a player may grasp pick 10 after being heated between the index finger and thumb and compress slightly, imparting an impression 14 of the thumb in first side 11 and an impression 15 of the index finger in second side 12. In another embodiment, a player may grasp pick 10 after being heated between the index finger, the middle finger, and thumb and compress slightly, imparting an impression 14 of the thumb in first side 11 and an impression 15 of the index finger and middle finger in second side 12, defining a generally "M" shape. In a further embodiment, a player may grasp pick 10' after being heated between the index finger and/or the middle finger, and thumb and compress slightly, imparting an impression 14 of the thumb in first side 11' and an impression 14 or 15 of the index finger and/or middle finger in second side 12'. Pick 10' defines one or more wings 13 extending vertically from opposing lateral sides of pick 10' to embrace a portion of the outer radius of a player's digit or digits. Wings 13 may then be manually urged around and over a portion of the player's digits. Specifically, the geometry of wings 13 defines a concavity relative to a vertical plane extending from the lateral edge(s) of pick 10' to accommodate the outer radius of the finger or fingers as described above in order to prevent slippage from the digit or digits during playing sessions. In each instance, the result is pick 10, 10' that is uniquely formed to the player's fingers, creating a firmer grip on the pick and reducing slippage during playing sessions, for example due to fatigue or moisture in the form of sweat or oil buildup over time. An additional step may include reheating and remolding the otherwise rigid pick 10, for example to accommodate a change in preferred grip orientation(s) or a change in style of play. A further additional step may include the insertion of a print or pattern into the body of pick 10, permitting a wide range of aesthetic presentation.

The illustrations and examples provided herein are for explanatory purposes and are not intended to limit the scope of the appended claims.

I claim:

1. A guitar pick comprising a generally triangular shape formed out of a polymeric material defining a body with first and second sides and a pair of wings extending vertically and arcuately relative to associated vertical planes extending from respective lateral edges of the guitar pick, each wing defining a concavity relative to a vertical plane extending from the lateral edge of the guitar pick, each concavity sized and shaped to accommodate an outer radius of a finger or fingers in order to prevent slippage of the digit or digits during playing of a stringed musical instrument, whereby the first and second sides are deformable when exposed to a predetermined temperature, whereby the first side, the second side, or the first and second sides of the guitar pick deform in response to manual impression or impressions by a user to form a guitar pick unique to that user when exposed to a predetermined temperature, and whereby when cooled relative to the predetermined temperature the guitar pick defines a level of rigidity configured so as to play the stringed musical instrument without distortion of the impression or impressions.

2. The guitar pick of claim 1 wherein the polymeric material is defined as a thermoplastic.

3. A method of creating a personalized guitar pick comprising,
   providing a guitar pick formed from a thermoplastic, the guitar pick defining first and second sides;
   heating the guitar pick to a predetermined temperature to render the first and second sides deformable;

manually impressing upon one or both sides of the guitar pick with one or more digits to generate a guitar pick with an individualized impression or impressions; and cooling the guitar pick relative to the predetermined temperature, resulting in the guitar pick defining a level of rigidity configured so as to play a stringed musical instrument without distortion of the impression or impressions.

4. The method of claim 3 wherein the thermoplastic is defined as acrylic.

5. The method of claim 3 wherein the step of providing a guitar pick comprises providing a guitar pick with a wing extending vertically from a lateral edge of the guitar pick.

6. The method of claim 5 wherein the wing extends arcuately from the lateral edge of the guitar pick.

7. The method of claim 6 wherein the wing defines a concavity relative to a vertical plane extending from the lateral edge of the guitar pick.

8. The method of claim 3 wherein the step of providing a guitar pick, comprises providing a guitar pick with a pair of wings oriented in opposing relation on the guitar pick and extending vertically from respective lateral edges of the guitar pick.

9. The method of claim 8 wherein the pair of wings extend arcuately from the respective lateral edges of the guitar pick.

10. The method of claim 9 wherein the pair of wings each define a concavity relative to associated vertical planes extending from the respective lateral edges of the guitar pick.

11. The method of claim 10 wherein the step of manually impressing upon the guitar pick further comprises grasping the guitar pick between the index finger and thumb and compressing slightly to impart an impression of the thumb in the first side and an impression of the index finger in the second side.

12. The method of claim 3 wherein the step of manually impressing upon the guitar pick further comprises grasping the guitar pick between the index finger and thumb and compressing slightly to impart an impression of the thumb in the first side and an impression of the index finger in the second side.

13. The method of claim 3 wherein the step of manually impressing upon the guitar pick further comprises grasping the pick between the index finger, the middle finger, and thumb and compressing slightly, imparting an impression of the thumb in the first side 11 and an impression of the index finger and middle finger in the second side defining a generally "M" shape.

14. A guitar pick comprising a generally triangular shape formed out of a polymeric material defining a body with first and second sides, whereby the first and second sides are deformable when exposed to a predetermined temperature, whereby the first side, the second side, or the first and second sides of the guitar pick deform in response to manual impression or impressions by a user to form a guitar pick unique to that user when exposed to a predetermined temperature, and whereby when cooled relative to the predetermined temperature the guitar pick defines a level of rigidity configured so as to play a stringed musical instrument without distortion of the impression or impressions.

15. The guitar pick of claim 14 further comprising a wing extending vertically and arcuately from a lateral edge of the guitar pick.

16. The guitar pick of claim 15 wherein the wing defines a concavity relative to a vertical plane extending from the lateral edge of the guitar pick, the concavity sized and shaped to accommodate an outer radius of a finger or fingers in order to prevent slippage of the digit or digits during playing of a musical instrument.

17. The guitar pick of claim 14 further comprising a pair of wings oriented in opposing relation on the guitar pick and extending vertically from respective lateral edges of the guitar pick.

18. The guitar pick of claim 17 further comprising a pair of wings oriented in opposing relation on the guitar pick and each extending vertically from respective lateral edges of the guitar pick.

19. The guitar pick of claim 18 wherein the pair of wings each extend arcuately from the respective lateral edges of the guitar pick.

20. The guitar pick of claim 19 wherein each of the pair of wings defines a concavity relative to a vertical plane extending from the lateral edge of the guitar pick, each concavity sized and shaped to accommodate an outer radius of a finger or fingers in order to prevent slippage of the digit or digits during playing of a musical instrument.

* * * * *